UNITED STATES PATENT OFFICE.

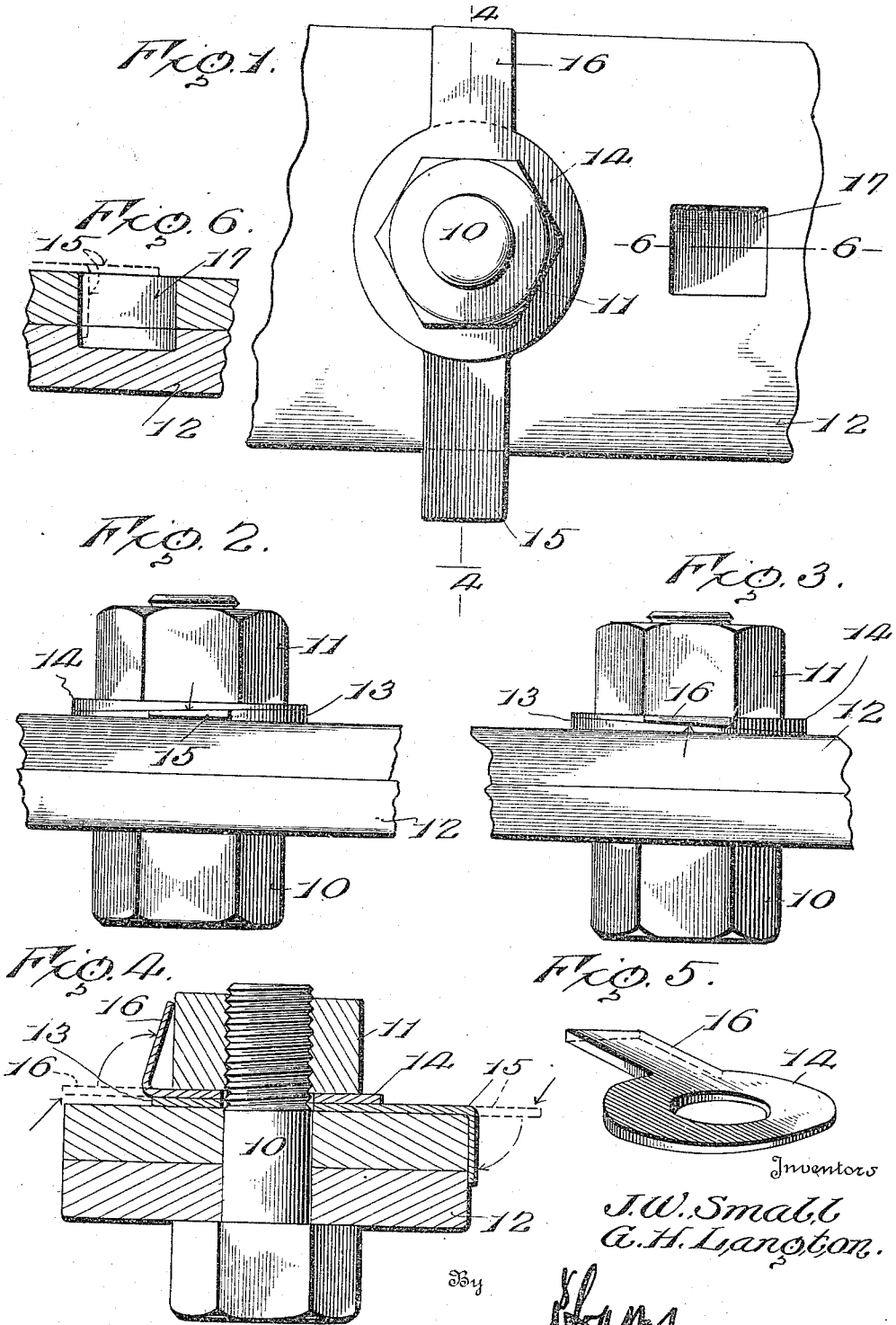

JOHN W. SMALL AND GEORGE H. LANGTON, OF PORTSMOUTH, VIRGINIA.

NUT-LOCK.

1,294,550. Specification of Letters Patent. Patented Feb. 18, 1919.

Application filed January 7, 1918. Serial No. 210,667.

*To all whom it may concern:*

Be it known that we, JOHN W. SMALL and GEORGE H. LANGTON, citizens of the United States, residing at Portsmouth, in the county of Norfolk and State of Virginia, have invented certain new and useful Improvements in Nut-Locks, of which the following is a specification.

This invention relates to an improved nut lock and has as its primary object to provide a device of this character which will not only be especially adapted for use upon the securing bolts of various machine elements, engine parts, and the like, but will also be found particularly efficient for use in connection with railway track construction, so that the device will thus prove an effective nut lock for general application.

The invention has as a further object to provide a nut lock wherein the nut, when initially applied, will be firmly locked against retrograde movement and wherein should the bolt stretch from excessive strain or should the parts wear to free the nut, retrograde movement of the nut will cause the device to again firmly lock the nut against displacement.

And the invention has as a still further object to provide a nut lock wherein any looseness which may occur incident to stretching of the bolt or wearing of the parts will, upon retrograde movement of the nut, be taken up by the device to again firmly bind the parts together and wherein any tendency toward retrograde movement of the nut will act to increase the binding action of the bolt and nut upon the said parts.

Other and incidental objects will appear as the description proceeds, and in the drawings wherein we have illustrated the preferred embodiment of the invention, and wherein similar reference characters designate corresponding parts throughout the several views:

Figure 1 is a plan view of our improved nut lock showing the locking tongues of the sections of the device before being bent to active position, Fig. 2 is a side elevation particularly illustrating the manner in which the locking tongue of the lowermost section of the device is adapted to lie flat against the work to be bent to engage therewith when the device is initially applied, Fig. 3 is a view similar to Fig. 2 and illustrating the manner in which the locking tongue of the uppermost section of the device is supported in spaced relation from the work so that a tool may be easily inserted beneath the said locking tongue for bending the tongue upwardly to engage an adjacent side face of the nut when the device is initially applied, Fig. 4 is a sectional view showing the manner in which the locking tongues of the coacting sections of the device are bent, one to engage with the work and the other to engage with the nut, Fig. 5 is a perspective view showing the uppermost section of the device in detail and illustrating the manner in which the body thereof is beveled, and Fig. 6 is a fragmentary sectional view illustrating the manner in which the work may be formed with a recess for receiving the bent portion of the locking tongue of the lowermost section of the device in any instance where it would be impractical to bend the said tongue around the work as illustrated in Fig. 4.

In order that an accurate understanding may be had of the construction, mounting and operation of our improved nut lock we have, in the drawings, shown the device in connection with a conventional type of bolt 10 equipped with a nut 11, the bolt being illustrated as fitted through coacting machine elements 12 forming the work.

In carrying out the invention a locking washer is employed and is loosely fitted upon the bolt beneath the nut. This locking washer is, as particularly shown in Figs. 2 and 3 of the drawings, split diagonally into coacting sections 13 and 14 respectively. Each of the sections is, therefore, provided with a flat outer face and a beveled inner face and tapers gradually from one side thereof toward its opposite side. The beveled faces of the said sections are smooth, as shown in detail in Fig. 5, and presented to each other to provide coacting cam surfaces. Extending radially from the section 13 of the washer is a flexible locking tongue 15 the uppr face of which is, as shown in Fig. 2, beveled with the inner face of the said section. The section 14 is formed with a similar radially extending locking tongue 16 and, as shown in Fig. 3, the lower face of this tongue is beveled with the inner face of the said section.

In applying the device, the section 13 of the locking washer is first placed upon the bolt with its outer flat face presented to the work. The section 14 is then fitted in position to rest at its beveled face upon the beveled face of the section 13, when the nut is screwed upon the bolt to engage the flat face of the outer section. Prior to the tightening of the nut the sections 13 and 14 are first rotated with respect to each other until the locking washer is of uniform thickness throughout its area, when, as shown in Fig. 1 of the drawings, the locking tongues 15 and 16 will be disposed diametrically opposite each other. The nut is then adjusted to tightly clamp the sections of the washer therebeneath as well as bind the coacting elements of the work together. The outer extremity of the locking tongue 15 is then bent downwardly to engage the adjacent edge of the work, as shown in Fig. 4, and in this connection attention is directed to the fact, as shown in Fig. 2 of the drawings, that the said tongue is disposed to seat flat against the work so that this bending of the outer extremity of the tongue may be easily accomplished by simply hammering thereon. In any instance where the work is of such width that the tongue 15 would not extend to an adjacent edge, the work is, as shown in Figs. 1 and 6, provided with a suitable recess 17 for receiving the outer bent extremity of the tongue. The tongue 15 when thus bent downwardly to engage the work will, therefore, act to rigidly lock the section 13 of the washer against rotation. The tongue 16 of the section 14 of the washer is then bent upwardly to engage, as shown in Fig. 4, with an adjacent side face of the nut and it will be noted, as shown in Fig. 3, that the outer extremity of the said tongue is so disposed that a suitable tool may be easily inserted between the outer end of the tongue and the work so that the upward bending of the tongue may thus be readily accomplished. When engaged with the nut, the tongue 16 will, of course, connect the section 14 of the washer with the nut to be rotated thereby.

As will now be seen, the cam surfaces of the sections of the washer will coact to prevent retrograde movement of the nut. The nut will thus be securely locked on the bolt. However, should the bolt stretch from excessive strain or should the parts become worn to create a resultant looseness of the nut, retrograde movement of the nut when so loosened will rotate the section 14 of the locking washer upon the section 13 thereof. The cam surfaces of the sections of the washer will consequently again be moved into binding contact with each other for taking up such looseness, the thick portion of the washer section 14 being then moved in a direction over the thick portion of the washer section 13 to accordingly wedge between the work and the nut. Wedging of the washer sections beneath the nut will, of course, act to lock the nut against further retrograde movement, any tendency of the nut to move in a retrograde direction then acting to only increase the wedging action of the washer sections beneath the nut to more firmly lock the nut against such movement. At the same time, looseness between the nut and the work will be correspondingly taken up so that the bolt will always act to firmly secure the elements of the work together.

It will, therefore, be seen that we provide a particularly simple form of nut lock and at the same time a highly efficient construction. Furthermore, the nut lock is of such nature that it may be employed in connection with substantially any conventional type of bolt or nut. While in the drawings we have indicated that the coacting sections of the locking washer are initially so positioned upon the bolt that the locking tongues of the said sections extend in opposite directions, still it will be noted that each of the said sections may be reversed side for side and since the locking tongues thereof are beveled so as to not interfere with the rotation of the sections with respect to each other or interfere with the seating of a nut, the sections may be placed upon the bolt without regard as to which faces of the said sections confront each other, it always being possible to subsequently adjust the sections so that when the nut is initially locked in position the locking washer will be of uniform thickness. Moreover, the sections of the washer may, if desired, be interchanged without affecting the efficiency of the device in its operation. Consequently, it will be further seen that we have provided a nut lock which will be found highly practical in actual use and one wherein the sections of the locking washer, no matter how applied with respect to each other, will always properly coact for locking the nut upon the bolt.

Having thus described the invention, what is claimed as new is:

1. A nut lock including coacting beveled sections having corresponding sides thereof formed throughout their entire area with smooth and uninterrupted beveled faces and shiftable with respect to each other for increasing the effective thickness of the sections, and means carried by the said sections respectively for securing one of the sections against movement and for connecting the other section with a nut.

2. A nut lock including coacting beveled sections shiftable with respect to each other for increasing the effective thickness thereof, and means carried by the said sections respectively for holding one of the sections against movement and for securing the other section for movement with respect to the first section, these sections being reversible side for side.

3. A nut lock including a locking washer split diagonally into coacting sections shiftable with respect to each other for increasing the effective thickness of the washer, and locking tongues carried by the said sections respectively for holding one of the sections against movement and for securing the other sections for movement with respect to the first section.

4. A nut lock including coacting sections each having a smooth flat face and an uninterrupted beveled face coacting with the beveled face of the other section, the said sections being reversible side for side to dispose their flat faces in coacting relation and being shiftable with respect to each other for increasing the effective thickness of the sections, and means carried by the said sections respectively for holding one of the sections against movement and for connecting the other section with a nut.

5. A nut lock including a locking washer split diagonally into coacting sections shiftable with respect to each other for increasing the effective thickness of the washer, and means projecting laterally from the said sections respectively for holding one of the sections against movement and for connecting the other section with a nut.

In testimony whereof we affix our signatures.

JOHN W. SMALL. [L. S.]
GEORGE H. LANGTON. [L. S.]

Copies of this patent may be obtained for five cents each, by addressing the "Commissioner of Patents, Washington, D. C."